(12) United States Patent  
Monteverde

(10) Patent No.: US 7,707,063 B2  
(45) Date of Patent: *Apr. 27, 2010

(54) INTERNET-BASED ADVERTISING AND REFERRAL SYSTEM

(75) Inventor: Dante Monteverde, Barrington Hills, IL (US)

(73) Assignee: Emergency 24, Inc., Chicago, IL (US)

( * ) Notice: Subject to any disclaimer, the term of this patent is extended or adjusted under 35 U.S.C. 154(b) by 177 days.

This patent is subject to a terminal disclaimer.

(21) Appl. No.: 11/871,513

(22) Filed: Oct. 12, 2007

(65) Prior Publication Data

US 2008/0033823 A1    Feb. 7, 2008

Related U.S. Application Data

(63) Continuation of application No. 09/624,107, filed on Jul. 24, 2000, now Pat. No. 7,319,975.

(51) Int. Cl.
*G06Q 30/00* (2006.01)

(52) U.S. Cl. ............ 705/14.4; 705/14.16; 705/26; 705/27; 705/37; 707/2; 707/3; 707/4; 707/5; 707/7; 707/104.1

(58) Field of Classification Search ............ 705/14, 705/16, 14.4, 26, 27, 37; 707/7, 104.1
See application file for complete search history.

(56) References Cited

U.S. PATENT DOCUMENTS

| | | | | |
|---|---|---|---|---|
| 5,850,433 A | | 12/1998 | Rondeau | 379/201 |
| 5,963,915 A | * | 10/1999 | Kirsch | 705/26 |
| 5,991,740 A | * | 11/1999 | Messer | 705/27 |
| 6,006,222 A | * | 12/1999 | Culliss | 707/5 |
| 6,009,410 A | | 12/1999 | LeMole et al. | 705/14 |
| 6,064,979 A | | 5/2000 | Perkowski | 705/26 |
| 6,308,202 B1 | | 10/2001 | Cohn et al. | 709/217 |
| 6,405,175 B1 | | 6/2002 | Ng | 705/14 |
| 6,421,675 B1 | * | 7/2002 | Ryan et al. | 707/100 |
| 6,571,279 B1 | | 5/2003 | Herz et al. | 709/217 |
| 6,782,369 B1 | * | 8/2004 | Carrott | 705/1 |
| 6,876,997 B1 | | 4/2005 | Rorex et al. | |
| 2001/0037205 A1 | | 11/2001 | Joao | 705/1 |
| 2001/0056374 A1 | | 12/2001 | Joao | 705/14 |

* cited by examiner

*Primary Examiner*—Jean Janvier
(74) *Attorney, Agent, or Firm*—Seyfarth Shaw LLP; Joseph R. Lanser; Joseph P. Quinn

(57) ABSTRACT

A system for advertising with the assistance of an advertiser's associate web site includes enrolling advertiser's web sites for allowing customers to receive information or to electronically purchase items; enrolling advertiser's associates web sites that refer customers to the advertiser's web site in exchange for compensation; electronically providing to the customer's computer, specific hyperlinks via the advertiser's associate's web page that, when selected by a customer, cause a list of advertiser's to be transmitted to the customer's computer, wherein each of said items in said list comprises a selectable advertiser specific hyperlink to the corresponding advertiser; transmitting to the customer's computer a web page which corresponds to the advertiser specific hyperlink selected by the customer, to accomplish a referral to the advertiser; and determining and recording within a computer memory compensation for the advertiser's associate for the referral.

16 Claims, 1 Drawing Sheet

INTERNET-BASED ADVERTISING AND REFERRAL SYSTEM

RELATED APPLICATIONS

This application is a continuation application of U.S. patent application Ser. No. 09/624,107, filed Jul. 24, 2000, now U.S. Pat. No. 7,319,975 entitled "Internet-Based Advertising and Referral System."

BACKGROUND OF THE INVENTION

The present invention relates generally to electronic commerce and particularly to methods for marketing and advertising utilizing the Internet.

The term "Internet", as commonly used, represents a collection of interconnected networks that are linked together to form a global network. On this network, web sites present informational content and are linked together to form what is referred to as the World Wide Web. A user of the web typically uses a modem to access designated phone lines and thereby go "on-line". Software commonly referred to as a web browser is then used to find and select web sites, which electronically transmit to the user's computer requested web documents or web pages for viewing and interaction. Links from certain web sites to other web sites are accomplished by standard coding conventions, such as HTML code, which are inserted into the transmitted web documents and correspond to specific locations on the document. A link from one web site to another is often referred to as a hyperlink (hereinafter sometimes simply referred to as a "link") and typically is presented as a highlighted word or phrase (search term) at a location on the Internet user's computer monitor that can be selected by the user. Selection of such a word or phrase is typically accomplished by means of a mouse click on the computer monitor screen location of the chosen word or phrase.

Aside from providing information through web sites, the Internet has recently developed into a valuable marketing tool in which products and services are offered for sale on the web sites and sold to the Internet user (customer) on-line. Methods to enhance this marketing have included using links to create associate retail outlets for a vendor. One such system is described in detail in U.S. Pat. No. 6,029,141, where an on-line retail environment is created by a retail associate which is accessible over the Internet by the customer (Internet user). When the customer wants to purchase a particular item offered by a retail associate, a link is used to transfer the customer to the vender's web site, and if a sale is ultimately made a commission is then paid to the retail associate.

SUMMARY OF THE INVENTION

The present invention presents a computer based advertising and referral system for operation over the Internet in which a list of advertisers are presented to an Internet user when that user selects a key word or phrase on an associated web site that the user is visiting. The order in which the advertisers are presented to the Internet user is determined by a bidding system in which the highest bidder is awarded the highest position. When the Internet user selects a particular advertiser through the associated web site, a link transfer takes place and the associated web site owner is paid a commission for the referral.

More particularly, there is provided herein a system for advertising with the assistance of advertiser's associates' web sites which include enrolling advertiser's web sites for allowing customers to receive information or to electronically purchase items or services; enrolling advertiser's associates' web sites that refer customers to the advertiser's web site in exchange for compensation; electronically providing to the customer's computer, specific links via the advertiser's associate's web page that, when selected by a customer, cause a list to be transmitted to the customer's computer, wherein each of said items in said list comprises a selectable advertiser specific link to the corresponding advertiser; transmitting to the customer's computer a web page which corresponds to the advertiser specific link selected by the customer, to accomplish a referral to the advertiser; and determining and recording within a computer memory compensation for the advertiser's associate for the referral.

Figure 1:
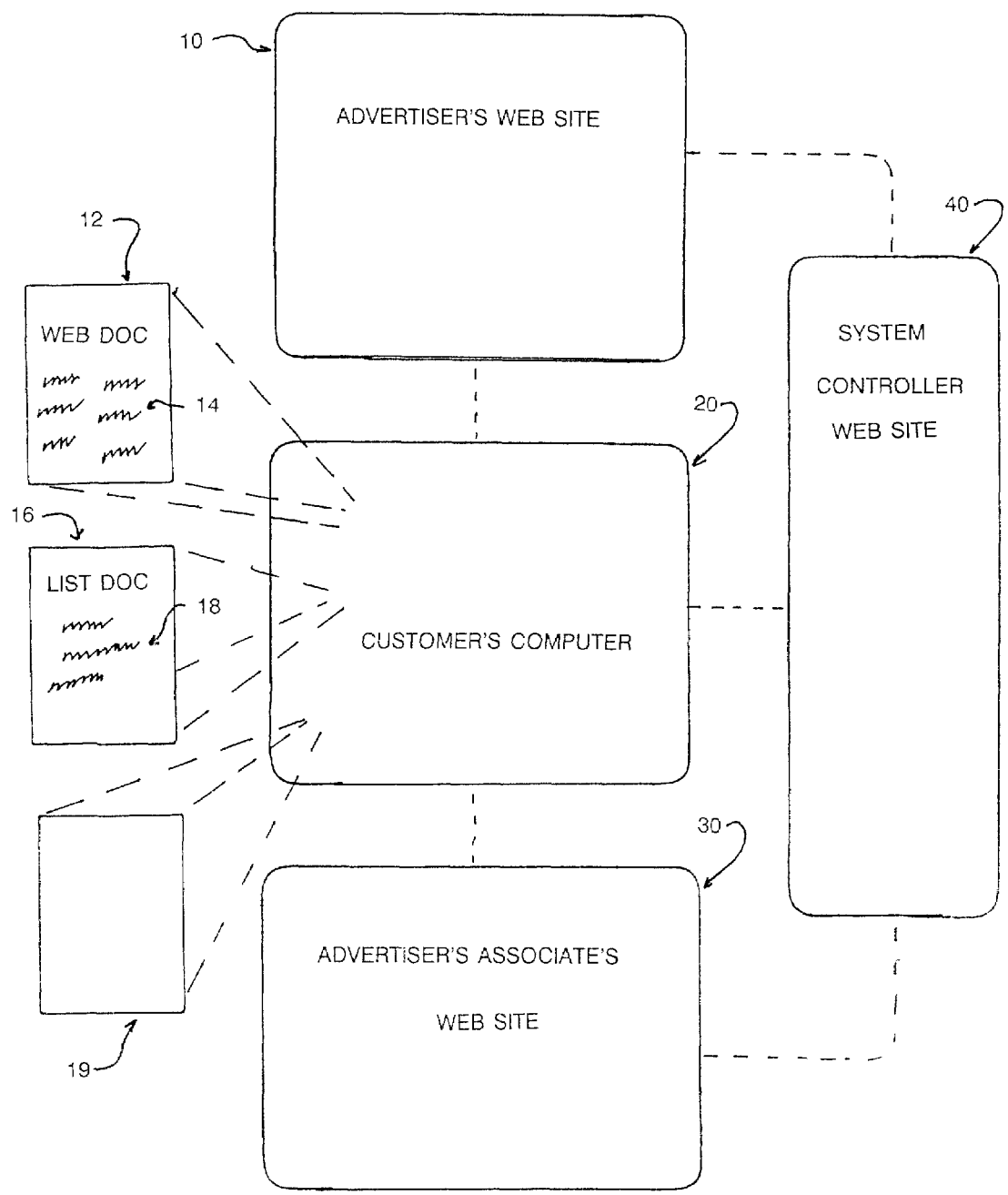
FIG. 1 is a block diagram of an Internet connection depicting the operation of the Internet-based advertising and referral system of the present invention.

While the invention will be described in connection with a preferred embodiment, it will be understood that it is not the intent to limit the invention to that embodiment. On the contrary, it is the intent to cover all alternatives, modifications, and equivalents as may be included within the spirit and scope of the invention as defined by the appended claims.

DESCRIPTION OF THE PREFERRED EMBODIMENT

Turning first to FIG. 1 there is shown, in block diagram form, a computer implemented system for Internet-based advertising including an advertiser's web site 10, a customer's computer 20, an advertiser's associate's web site 30, and the system controller web site 40. The system controller web site 40 provides a variety of functions, such as: it serves to enroll the advertiser's web site 10 and the advertisers' associate's web site 30; it inserts the requisite HTML codes into the advertiser's associate's web site 30 for the search terms 14; it provides the list of advertisers 16 to the customer; and it keeps track of the referrals.

When a customer accesses the Internet and selects an advertiser's associate's web site 30, a document 12 is transmitted to the customer's computer 20 from the advertiser's associate's web site 30 and displayed on the customer's computer 20 monitor. This document includes means for electronically providing to the customer's computer 20 specific search terms 14 via the advertiser's associate's web site 30. Particularly, the document transmitted to the customer's computer 20 contains specific linking search terms 14 in the form of words or phrases which appear at specific monitor screen locations and which the customer may select in accordance with means well known in the art. When a particular search term 14 is so selected, a link is created that transfers the customer to the system controller web site 40 which then provides to the customer's computer 20 a list of advertisers 16 relating to the enrolled advertisers. The items 18 of the list of advertisers 16 may include the names of one or more advertisers, descriptions of the advertisers and/or descriptions of their products or services, all of which may be customized by the respective advertiser. However, each item 18 in the list of advertisers 16 comprises a selectable "advertiser link", that is each item 18 may be selected by the customer and serves as a link to the corresponding advertiser's web site 10. Once a particular item 18 is selected by the customer, the system controller web site 40 transfers the customer to the advertiser's web site 10 to facilitate the transmission of the advertiser's selected web documents 19 to the customer's computer 20.

An advertiser interested in participating in this system typically contacts the system controller web site 40 through an "on-line" connection to enroll. The system controller web site 40 will enroll the advertiser and assign an advertiser identifier, which will then be used to track the referrals made to the advertiser. The tracking of referrals by the system controller web site 40 is accomplished by collecting data on the search terms 14 and the items 18 selected by a customer and includes means for determining the amount of payment due from the advertiser and means for providing a report to the advertiser. More particularly, the data obtained through tracking the identifiers in a referral is recorded in a computer memory and is subsequently used to provide an "on-line" accounting report.

Once enrolled, the advertiser selects, in conjunction with the system controller web site 40, specific search terms 14 that the advertiser believes will draw potential customers. For each selected search term 14 the advertiser bids an amount of payment which the advertiser will pay to the system controller web site 40 for each referral accomplished through the system by means of that search term 14. For a particular referral, a portion of the bid amount is retained by the system controller web site 40 and the balance is paid to the advertiser's associate as a referral fee. Consequently, this bid corresponds to the compensation that the advertiser agrees to pay to the advertiser's associate's web site 30 for each referral. Moreover, the amount of the bid will also be used by the system controller web site 40 to determine the placement of the advertiser in the list of advertisers 16 provided to the customer when a particular search term 14 is selected.

A web site owner interested in participating in this system as an advertiser's associate web site 30 typically contacts the system controller web site 40 online and enrolls as an advertiser's associate web site 30. The system controller web site 40 enrolls the advertiser's associate web site 30 and assigns an advertiser's associate identifier to the advertiser's associate web site 30 which will be used to track the referrals made through that site.

Once enrolled, the advertiser's associate chooses, in conjunction with the system controller web site 40, certain words or phrases to include in its web pages as search terms 14 for link selection by the customer. The system controller web site 40 then inserts the necessary HTML codes to cause a link to the system controller web site 40 and return a list of advertisers 16 upon the customer's selection of the target search term 14. As before, the system controller web site 40 collects data on the search terms 14 and the items 18 selected by the customer and records this data in a computer memory. By using this data, the system controller web site 40 calculates the commission due the advertiser's associate's web site 30 based upon the search term 14 used by the customer and the corresponding amount bid by the advertiser, and then compiles an accounting report of the payment due the advertiser's associate web site 30 and the payment due from the advertiser.

A typical customer using the Internet will enter the system via the customer's computer 20 and, using an Internet browser software program, locate a particular advertiser's associate's web site 30, and display a document 12 transmitted there from. Since the advertiser's associate's web site 30 is an enrolled advertiser's associate, specific words or phrases of interest to the customer are displayed within the document and contain HTML codes (to create hyperlinked versions of the search terms 14). These search terms 14 then transfer the customer to the system controller web site 40, upon selection of a particular search term 14, and causes the system controller web site 40 to transmit to the customer's computer 20 a list of advertisers 16 comprising a list of items 18. The list of items 18 may include a compilation of descriptive information on specific advertisers or on their respective products or services. It may contain one or more names, selected identifying information, or customized descriptions provided by the advertisers which have bid on that search term. Each of the items 18 in this list of advertisers 16 also includes an HTML hyperlink to the respective advertiser's web site 10, such that selection of that item 18 in the list of advertisers 16 by the customer links the customer to the corresponding advertiser's web site 10. In turn this link to the advertiser's web site 10 causes a web document 19 of the advertiser to be transmitted to the customer's computer 20. The customer is now in a position to receive information or to purchase products or services from the advertiser.

This system of the present invention may be described generally as a facilitating relationship between an advertiser's web site 10 who wants to promote traffic to its web site and an advertiser's associate's web 30 site that desires to promote the web sites of others, for compensation. Since the advertiser can control the search terms 14 by appropriate selection and bidding with the system controller web site 40, advertisers can effectively screen visitors to the advertiser's web site 10 and control the traffic; and since an advertiser can change its selection of search terms 14 and its bid at any time on-line, it can dynamically affect the traffic to its web site. From the perspective of the advertiser's associate's web site 30, any owner of any web site is now able to easily generate income while providing a valuable service to its customer and to the advertiser.

As specific example of the operation of this system, the enrolled advertiser could be a greeting card vendor, the enrolled advertiser's associate could be a flower vendor, and the search term selected by both could be "greeting cards". Since the flower vendor's web site would be visited by customers interested in purchasing flowers, they might also be interested in purchasing greeting cards to accompany the flowers. And when the visitor to the web site of the flower vendor selects the hyperlinked search term "greeting cards" from the flower vendor's web site, the enrolled greeting card advertiser's name and description, or other information, is provided to the customer as an item. Upon subsequent selection of this item, the web page of the advertiser is transmitted to the customer, and the flower vendor earns a commission for the referral.

Employing the versatility of this system, topical web sites can be easily created to provide compilations of vendors. As an example, an advertiser's associate web site 30 can be created to list a collection of cities to visit, where the name of each city alone is a hyperlink that returns a list of related businesses, such as travel agencies, tour bus companies, etc., as the items.

Cooperative advertising or cooperative promotional programs can also be developed using this system, such that, for example, a manufacturer enrolls in the position of the advertiser associate to promote a particular product, and its dealers enroll as advertisers. The manufacturer then promotes its web site to customers and the dealers select search terms and bid for position on the list returned to the customer when that search term is selected. In this instance, the manufacturer could establish specific or minimum bids to effect a cooperative advertising program.

Similarly, promotional or sales organizations can be established to promote any product or service, or combination thereof, using this system. Dealers, companies that make or sell products or offer services, can be solicited to be enrolled as advertisers, and one can establish a promotional web site as the promoter and enroll in the position of advertiser's associate.

Search terms appropriate for the promotion of the specific products or services can be chosen, and the dealers can bid on the various search terms which will be used to route traffic to the dealers. By advertising the promotional web site, income can be generated for the promoter and referral traffic generated for the enrolled dealers.

From the foregoing description, it will be apparent that modifications can be made to the apparatus and method for using the same without departing from the teachings of the present invention. Accordingly, the scope of the invention is only to be limited as necessitated by the accompanying claims.

The invention claimed is:

1. A method of facilitating internet based promotional advertising comprising:
   providing a system having a plurality of advertisers' web sites and an advertiser associate's web site to refer a customer's computer to at least one of the advertiser's web sites in exchange for compensation;
   respectively assigning advertiser identifiers to the advertisers' web sites;
   assigning an advertiser associate identifier to the advertiser associate's web site;
   causing transmission to the customer's computer of a first selectable hyperlink that is directed to information having a plurality of advertiser hyperlinks respectively linked to the plurality of advertisers' web sites;
   causing the displaying of the first selectable hyperlink on the customer's computer in response to the customer's computer accessing the advertiser associate's web site; and
   causing transmission of the information to the customer's computer in response to the customer's computer selecting the first selectable hyperlink.

2. The method as claimed in claim 1 further comprising providing in the first selectable hyperlink a term chosen by the advertiser associate's web site.

3. The method of claim 1 further comprising causing transmission of an advertiser's web site to the customer's computer in response to the customer's computer selecting the corresponding advertiser hyperlink, thereby accomplishing a referral.

4. The method of claim 1 further comprising using the advertiser identifier to identify the advertiser's web site that was transmitted to the customer's computer.

5. A method of compensating internet based advertising referrals in a web site system having a plurality of advertisers and at least one advertiser associate and an Internet user's computer capable of receiving information, the method comprising:
   respectively assigning advertiser identifiers to the plurality of advertisers;
   recording each advertiser identifier within a computer memory;
   assigning an advertiser associate identifier to the advertiser associate;
   recording the advertiser associate identifier within the computer memory;
   causing the displaying of the first selectable hyperlink on the Internet user's computer in response to the Internet user accessing a web site of the advertiser associate; and
   causing a plurality of advertiser hyperlinks that are respectively linked to web sites of the plurality of advertisers to be transmitted to the Internet user's computer in response to selection of the first selectable hyperlink by an Internet user.

6. The method as claimed in claim 5 further comprising causing transmission of the web site of an advertiser to the Internet user's computer in response to the Internet user selecting a corresponding advertiser hyperlink, thereby accomplishing a referral.

7. A computer advertising system, comprising:
   an advertiser associate's website accessible by a user; and
   a first selectable hyperlink, on said advertiser associate's website, to a plurality of advertisers' hyperlinks, said plurality of advertisers' hyperlinks pointing to respective websites of said plurality of advertisers.

8. The system of claim 7, wherein said first selectable hyperlink includes a term chosen by the advertiser associate's website.

9. The system of claim 7 wherein the plurality of advertisers' hyperlinks are arranged based upon amounts of payments to said advertiser associate's website.

10. A method of internet-based advertising comprising:
    providing a system having a plurality of advertisers' web sites and an advertiser associate's web site with a first selectable hyperlink;
    providing a plurality of advertiser hyperlinks that are respectively directed to the plurality of advertisers' web sites;
    displaying the first selectable hyperlink in response to an Internet user accessing the advertiser associate's web site; and
    transmitting to the Internet user's computer the advertiser hyperlinks in response to select on of the first selectable hyperlink by the Internet user.

11. The method as claimed in claim 10 further comprising providing in the first selectable hyperlink a term chosen by the advertiser associate's web site.

12. The method as claimed in claim 10 further comprising causing transmission of an advertiser's web site to the Internet user's computer in response to selection of a corresponding advertiser hyperlink by the Internet user, thereby accomplishing a referral to the advertiser's web site.

13. The method of claim 10 further comprising providing an enrollment system allowing web site owners to enroll as the advertiser associate's web site.

14. The method of claim 13 wherein the enrollment system further allows a web site owner to enroll as one of the advertisers' web sites.

15. The method of claim 10 wherein the plurality of advertiser hyperlinks are arranged based upon an amount of payment corresponding to the compensation each advertiser's web site agrees to pay for the referral.

16. The method of claim 15 wherein the advertiser's web sites bid on the amount of payment.

* * * * *